United States Patent [19]
Kappel

[11] Patent Number: 5,483,382
[45] Date of Patent: Jan. 9, 1996

[54] PROJECTION LENS AND METHOD OF USING SAME

[75] Inventor: David Kappel, Oceanside, Calif.

[73] Assignee: Proxima Corporation, San Diego, Calif.

[21] Appl. No.: 123,133

[22] Filed: Sep. 17, 1993

Related U.S. Application Data

[63] Continuation-in-part of Ser. No. 59,550, Mar. 11, 1993, Pat. No. 5,321,450.

[51] Int. Cl.⁶ .............................. G02B 9/20; G02B 13/18
[52] U.S. Cl. ............................................. 359/786; 359/716
[58] Field of Search .................................. 359/786, 716, 359/717, 793, 795

[56] References Cited

U.S. PATENT DOCUMENTS

| | | | |
|---|---|---|---|
| 3,905,686 | 9/1975 | Ruben | 359/716 |
| 3,944,337 | 3/1976 | Ruben | 359/716 |
| 4,487,484 | 12/1984 | Mihara | 359/786 |
| 4,830,474 | 5/1989 | Nakayama et al. | 359/716 |

OTHER PUBLICATIONS

Smith, W. J.; *Modern Lens Design;* McGraw–Hill; Figs 12.3 and 12.4.

*Primary Examiner*—Scott J. Sugarman
*Attorney, Agent, or Firm*—Bernard L. Kleinke; Richard D. Clarke

[57] ABSTRACT

A new and improved projector lens arrangement which can automatically adjusted for focusing purposes in an easily and convenient manner according to a novel focusing method of the present invention. The projection lens arrangement generally includes three groups of optical elements aligned along a common optical axis with a variable vertex length and wide field coverage angle. One element group near the object is a doublet having a negative element with a concave surface and a positive element being bi-convex having one surface near the image complementarily shaped to the concave surface of the negative element.

19 Claims, 8 Drawing Sheets

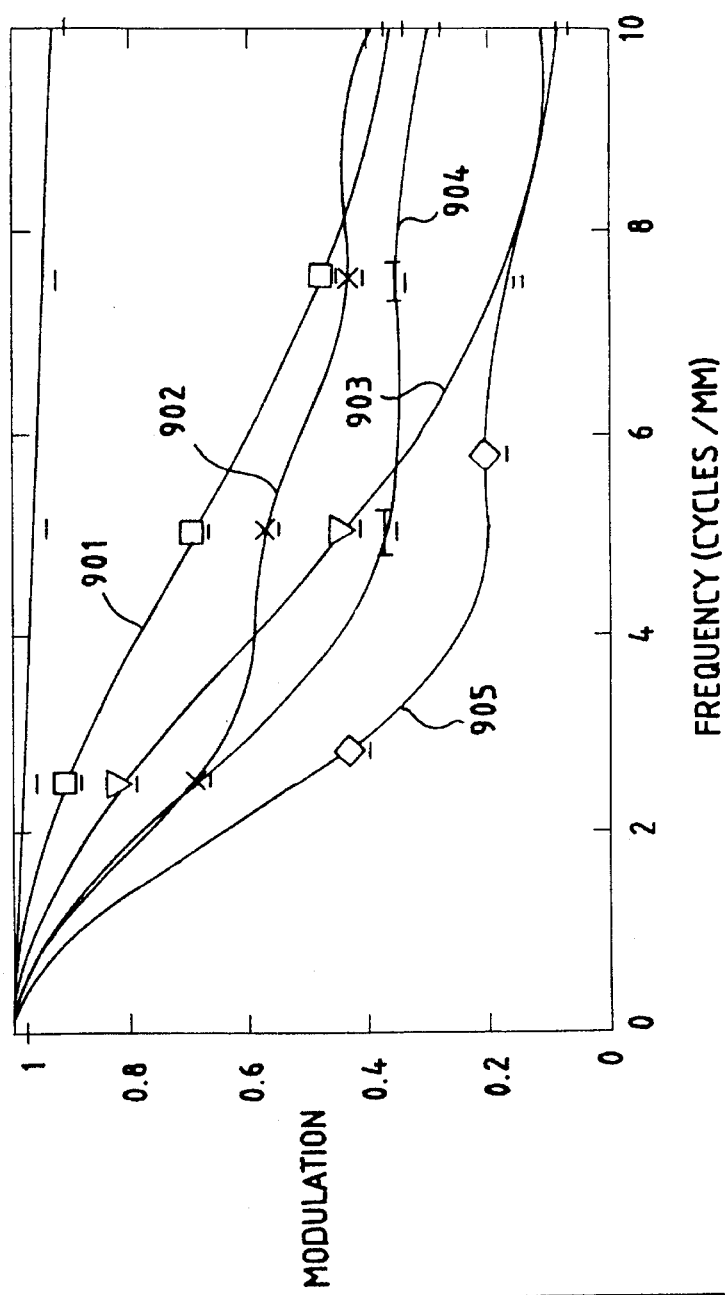

PROJECTION LENS AND METHOD OF USING SAME

CROSS-REFERENCE TO RELATED APPLICATIONS

This application is a continuation-in-part of U.S. patent application Ser. No. 08/059,550 entitled "A LOW PROFILE LIQUID CRYSTAL PROJECTOR AND METHOD OF USING SAME," filed Mar. 11, 1993, now U.S. Pat. No. 5,321,450, which application is commonly assigned and incorporated herein by reference.

TECHNICAL FIELD

The present invention relates in general to an improved lens arrangement and method of using it. The invention more particularly relates to a projection lens arrangement which may be used to facilitate focusing a projected image on a remote viewing surface.

BACKGROUND ART

Projection lens arrangements for focusing a projected image on a remote viewing surface are well known in the prior art. Such lens arrangements include those utilized with front and overhead projectors, and still and motion picture video projectors.

For example, consider the projection lens arrangement in a conventional overhead projector. In such a projector, the lens is mounted above and spaced-apart from the stage of the projector. A transparency or computer controlled liquid crystal panel for providing an image to be projected is positioned on the stage. The distance between the transparency or object and the entranceway to the projection lens is referred to as the object length and is about 15 inches in length in some overhead projectors. A Fresnel lens arrangement causes light, emitted from a high intensity lamp disposed below the stage, to be directed upwardly into the projection lens at an angle. This angle is called the field coverage angle and is about 18 degrees. For the purpose of focusing the image to be projected onto a remote viewing surface, the overall length of the projection lens arrangement is adjustable. This overall length is referred to as the vertex length of the lens arrangement.

While the above-described projection lens arrangement has proven satisfactory in large bulky overhead projectors, such an arrangement can not be readily used in a small compact projector system, such as a compact projector system disclosed in copending U.S. patent application Ser. No. 08/059,550.

In the case of a small compact projector, the object length must be substantially shorter and thus, the field coverage angle must be substantially greater. However, by increasing the field coverage angle various aberrations can be introduced, such as field curvature aberrations and other types of known aberrations.

Therefore, it would be highly desirable to have a new and improved projection lens arrangement and method of using the arrangement which can be used readily in a small compact projector system. Such a new and improved projection lens arrangement would have a relatively short object length but yet a sufficiently narrow field coverage angle to enable optical compensation for eliminating or at least substantially reducing the effect of optical aberrations such as field curvature aberrations.

In order to focus a variety of different sized images to be projected onto a remote viewing surface, a projection lens arrangement must be variable for focusing purposes. In this regard, the vertex length of the lens arrangement must be variable but yet sufficiently small to enable the lens arrangement to be utilized in a small compact projector system.

However, shortening the vertex length introduces other problems. For example, by shortening the vertex length it is difficult, if not impossible to have sufficient variations to reach substantially all anticipated field coverage angles when the arrangement employs a relatively short object length.

Therefore, it would be highly desirable to have a new and improved projection lens arrangement that has both a relatively small variable vertex length and object length to enable the lens to be utilized in a small compact projector but yet a sufficiently long vertex length to permit focusing for substantially all anticipated field coverage angles.

Another problem associated with a lens arrangement having a short vertex length is that the spacing between the optical elements within the lens arrangement must necessarily be very short in distance. Thus, in order to reach substantially all anticipated field coverage angles in a relatively convenient manner, the focusing adjustments must be very precise and accurate.

Therefore, it would be highly desirable to have a new and improved projection lens arrangement which can be easily and automatically adjusted to focus an image on a remote viewing surface. Such a lens arrangement should be easily adjusted for focusing purposes, and relatively inexpensive to manufacture.

DISCLOSURE OF INVENTION

Therefore, the principal object of the present invention is to provide a new and improved projection lens arrangement and method of using the arrangement which can be used readily in a small compact projector that is easily transportable.

Another object of the present invention is to provide such a new and improved projection lens arrangement that has a relatively short effective focal length but yet a sufficiently narrow field coverage angle to enable optical compensation for eliminating or at least substantially reducing the effect of optical aberrations, such as field curvature aberrations and other known aberrations.

Yet another object of the present invention is to provide such a new and improved projection lens arrangement that has both a relatively small variable vertex length and object length to enable the lens to be utilized in a small compact projector but yet a sufficiently long vertex length to permit focusing for substantially all anticipated field coverage angles.

A further object of the present invention is to provide a new and improved projection lens arrangement which can be easily and automatically adjusted to focus an image on a remote viewing surface. Such a lens arrangement should be easily adjusted for focusing purposes, and relatively inexpensive to manufacture.

Briefly, the above and further objects of the present invention are realized by providing a new and improved projector lens arrangement which has a relatively short object length, a sufficiently wide field coverage angle, and which can automatically be adjusted for focusing purposes in an easily and convenient manner according to a novel focusing method of the present invention.

The projection lens arrangement is configured in a Tessar configuration having generally three groups of optical elements aligned along a common optical axis with a variable vertex length and field coverage angle of up to about 22.1 degrees. At least one of the element surfaces are aspheric. One element group near the object is a doublet having a negative element with a concave surface and having a positive element, which is bi-convex and has one surface near the image, the surface being complementary shaped to the concave surface of the negative element.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein:

FIG. 8 is a modulation verus frequency representation of the modulation transfer functions of the lens arrangement of FIG. 1 where the conjugate is 4.0 feet in length;

BEST MODE FOR CARRYING OUT THE INVENTION

Figure 1:
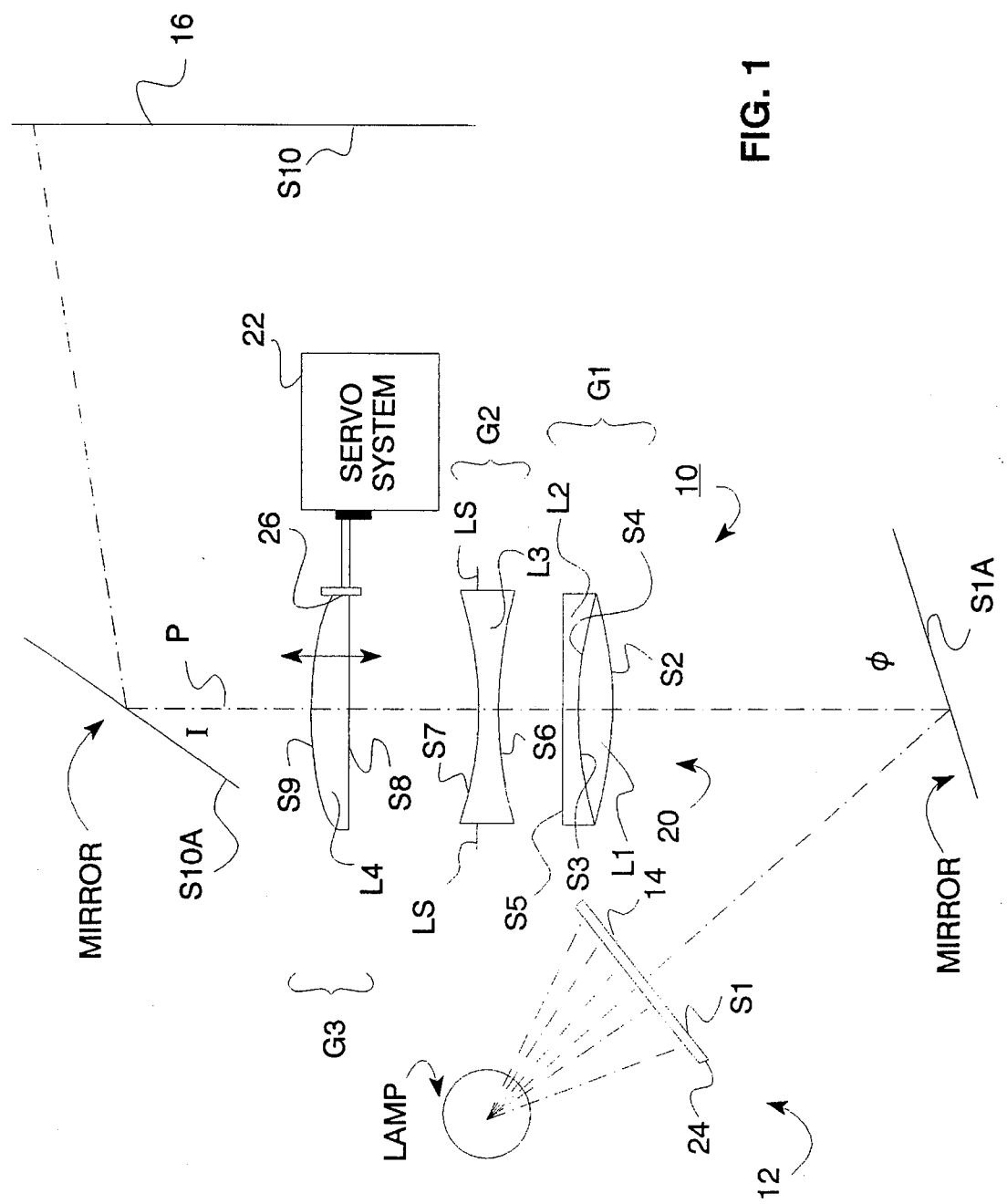
FIG. 1 is a diagrammatic view of a projection lens system which is constructed in accordance with the present invention and which is illustrated with a liquid crystal projector.

Referring now to the drawings and more particularly to FIG. 1 thereof, there is shown a projection lens system 10 which is constructed in accordance with the present invention. The projection lens system 10 is illustrated with a liquid crystal projector 12 and in accordance with the method of the present invention can cause a liquid crystal image to be focused on a remote viewing surface, such as a remote viewing surface 16.

The projection lens system 10 generally comprises a projection lens arrangement 20 having a Tessar configuration, variable vertex length and a wide field coverage angle. The lens arrangement 20 is coupled mechanically to a servo system 22 for adjusting the focal length of the lens arrangement 20 to cause a projected liquid crystal image to be focused on the remote viewing surface 16.

The projection lens arrangement 20 generally includes three groups G1, G2 and G3 (FIG. 1) of lens elements arranged along a common optical path P from an object end φ to an image end I of the lens arrangement 20. The lens arrangement 20 is disposed between an object surface S9 via a mirror surface S1A and an image surface S10A. The first group, said second group and said third group having respective optical powers K1, K2 and K3, with an overall optical power of about 0.0037 inverse millimeter. The optical power K1 is about 0.00825 inverse millimeter. The optical power K2 is about –0.01365 inverse millimeter. The optical power K3 is about 0.00783 inverse millimeter.

The back focal length between the back vertex of the lens arrangement 20 and the object surface S1A is about twelve inches or about 254.6 millimeters. The object surface S1A is generally rectangular in shape having a corner to corner diagonal length of about 8.4 inches or about 106.68 millimeters. Based on the foregoing, those skilled in the art will understand the effective focal length of the lens arrangement is between about 10.24 inches or about 260.86 millimeter and about 11.00 inches or about 280.01 millimeters.

In order to reach full field coverage of the object with good resolution, the lens arrangement 20 has a field coverage angle of up to about 22.1 degrees. In this regard, the resolution of the projection lens arrangement 20 is about 6 line pairs per millimeter.

The vertex length of the projection lens arrangement 20 is about 1.81 inches or about 46.22 millimeters. The vertex length is adjustable and has an adjustment range between a short length of about 1.497 inches or about 38.02 millimeters and a full length of about 1.81 inches or about 46.22 millimeters. The aperture or speed of the projection lens arrangement 20 is about f/5.

In order to identify the sequence positioning of groups G1, G2 and G3 from the object end φ to the image end I, the lens elements are designated in their sequential position as L1–L4. Groups G1 and G2 comprise the inventive projection lens. Lens L4 is a Fresnel lens. Also, in order to identify the sequence positioning of the lens element surfaces, the surfaces are designated in their sequential positions as S8–S2 from the object end φ to the image end I of the lens arrangement 20.

Considering now group G1 in greater detail with reference to FIG. 1, group G1 is configured in a doublet arrangement including the lens elements L1 and L2 respectively. Lens elements L1 and L2 cooperate together to provide positive optical power where lens element L2 counter corrects lens aberrations introduced by lens element L1.

Considering now lens element L1 in greater detail with reference to FIG. 1, surface S7A is complementary to surface S7 of lens element L2 to permit the two lens elements L1 and L2 to be contiguous along their respective surfaces S7A, S7. The radius of curvature of surface S7A of lens L1 is identical to surface S2 of lens L4. In this regard, only a single test plate (not shown) is required to verify the curvature of lens L1 and L4. Lens L1 and L3 introduce undercorrected spherical aberration and astigmatism, as well as positive field curvature.

Considering now lens element L2 in greater detail with reference to FIG. 1, surface S5 of lens element L2 is generally plano while surface S4 of lens element L2 is generally concave. As noted earlier, surface S4 is complementary to surface S3 of lens element L1. The function of lens element L2 is to balance the aberration of lens L1 and L3 by introducing overcorrected spherical aberration and astigmatism, as well as negative field curvature.

Considering now group G2 in greater detail with reference to FIG. 1, group G2 includes a single lens element L3, having a lens stop LS. Lens element L3 is a bi-concave element of negative optical power for counter correcting lens aberration introduced by lens elements L1 and L2.

Lens element L3 includes two surfaces S5 and S4 respectively, where each of the surfaces S5 and S4 are generally concave. The distance between surface S4 of lens element L3 and surface S3 of lens group G3 is variable.

Considering now group G3 in greater detail with reference to FIG. 1, group G3 includes a single lens element L4 of positive optical power. The function of lens element L4 is to relay the height output from the projection lens groups G1 and G2.

As best seen in FIG. 1, lens element L4 includes two surfaces S8 and S9. Lens surface S3 of lens element L4 is generally plano. The distance between surface S3 of lens element L4 and surface S4 of lens element L3 is variable as lens element L4 is mounted movably relative to lens element L3. In this regard, the servo system 22 enables the lens element L4 to be moved rectilinearly along a track 26 by about 0.313 inches or about 8.20 millimeters.

As will be made apparent from the examples that follow in Table I, the aspherical surface S10 may be defined by the following equation:

$$X = \left( \frac{Cy^2}{1 + \sqrt{1 - C^2(K+1)y^2}} \right) + Z \quad (1)$$

$$\text{where } z = p_1 y^2 + p_2 y^4 + p_3 y^6 + p_4 y^8 \quad (2)$$

Those skilled in the art will understand that X is a surface sag from the semi-aperture distance y from the axis or optical path P; that C is the curvature of a lens surface of the optical axis P equal to the reciprocal of the radius of the optical axis P; and that K is a conic constant (cc) or other surface of revolution.

The following example in Tables I is an exemplary of the lens arrangement 20 embodying the present invention and which is useful primarily for projecting a full color liquid crystal image color corrected. The lens arrangement of Table I has aspheric surface S10 defined by the foregoing aspheric equation. In the table, the surface radius for each surface, such as surface S2, is the radius at the optical axis P, $N_d$ is the index of refraction, and $V_d$ is the Abbe number. Positive surface radii are struck from the right and negative radii are struck from the left. The object is to the left at surface S1 of a liquid crystal display panel 24.

TABLE I

A lens as shown in FIG. 1 scaled for a 5.6 foot conjugate; object distance of 1706.00000 mm; object height of -700.000000; and entrance pupil radius of 17.66231.

| Lens Ele. No. | Surf. Desig. | Radius (mm) | Axial Distance Between Surfaces (mm) | Aperture Radius (mm) | Element Comp. |
|---|---|---|---|---|---|
| | Entrance Pupil | | −17.09756 | 17.66231 K | AIR |
| | S2 | 73.82133 | 7.50184 | 26.00000 K | BAK1 |

TABLE I-continued

| | | | | | |
|---|---|---|---|---|---|
| L4 | | | | | |
| | S3 | — | 10.27072 V | 26.00000 K | AIR |
| | | 1112.99810 | | | |
| | S4 | −99.73322 | 2.69314 | 24.50000 A | LF5 |
| L3 | | | | | |
| | S5 | 75.04693 | 8.70928 | 24.50000 | AIR |
| | S6 | −274.05990 | 2.81867 | 24.50000 K | KF6 |
| L2 | | | | | |
| | S7 | 62.88152 | 9.99902 | 24.50000 K | SK2 |
| L1 | | | | | |
| | S8 | −73.82133 | 289.33000 | 24.50000 K | AIR |
| 24 | | | | | |
| | S9 | — | 3.98780 | 124.71569 S | ACRYLIC |
| | S10 | −46.72718 | 10.49020 | 132.00000 | AIR |

| Lens Element | Element Comp. | Refractive Indices ($N_d$) | | | |
|---|---|---|---|---|---|
| | | RN1/RN4 | RN2/RN5 | RN3/RN6 | VNBR |
| | AIR | — | — | — | — |
| L4 | BAK1 | 1.57250 | 1.57943 | 1.56949 | 57.54848 |
| | AIR | — | — | — | — |
| L3 | LF5 | 1.58144 | 1.59146 | 1.57723 | 40.85149 |
| | | 1.59964 | — | — | — |
| | AIR | — | — | — | — |
| | KF6 | 1.51742 | 1.52434 | 1.51443 | 52.19566 |
| | | 1.52984 | — | — | — |
| L2 | SK2 | 1.60738 | 1.61486 | 1.60414 | 56.65632 |
| | | 1.62073 | — | — | — |
| | AIR | — | — | — | — |
| 24 | ACRYLIC | 1.49177 | 1.49799 | 1.48901 | 56.01934 |
| | | 1.50377 | — | — | — |
| | AIR | — | — | — | — |

Aspheric parameters of S10

| | |
|---|---|
| CC | −1.01435 |
| P1 | 0.00711 |
| P2 | −2.6576 × 10$^{-8}$ |
| P3 | 4.1592 × 10$^{-14}$ |
| P4 | 1.5503 × 10$^{-17}$ |

Figure 2A:
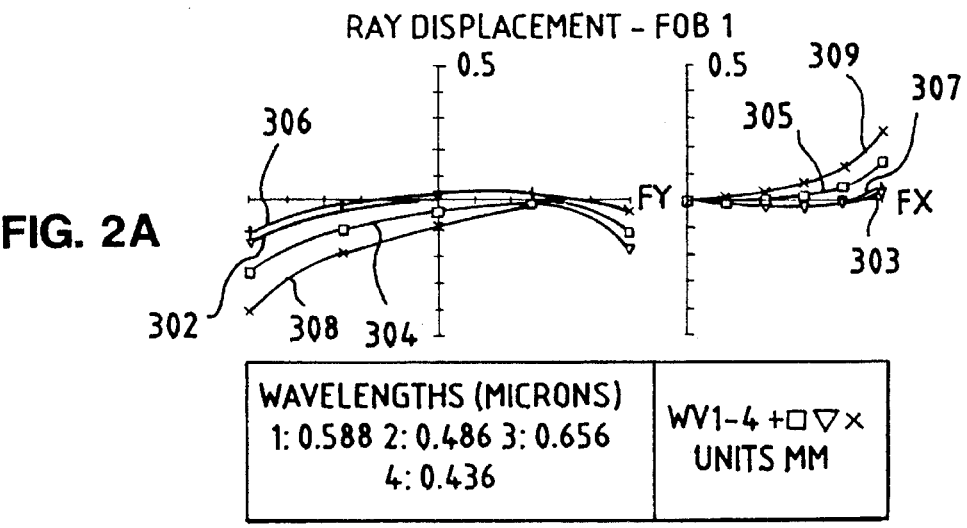
FIGS. 2A–2C is a graphical representation of ray deflection of the projection lens arrangement of FIG. 1 for various FOB lengths where the conjugate is 5.6 feet in length.
Figure 2B:
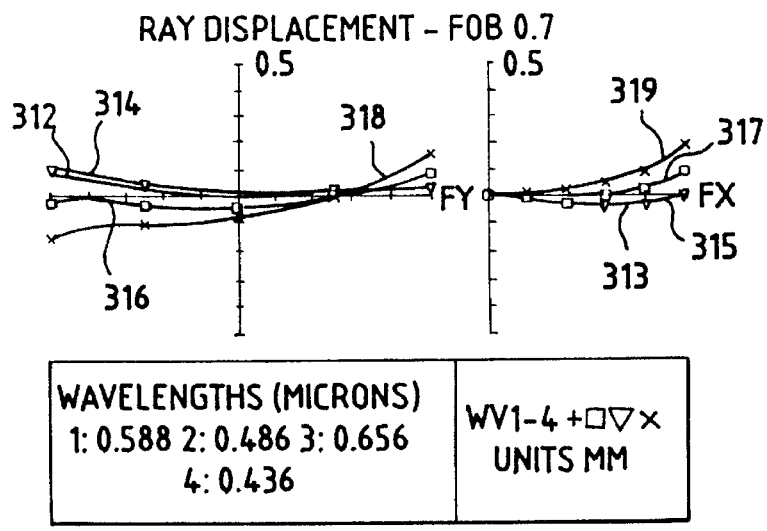
Figure 2C:
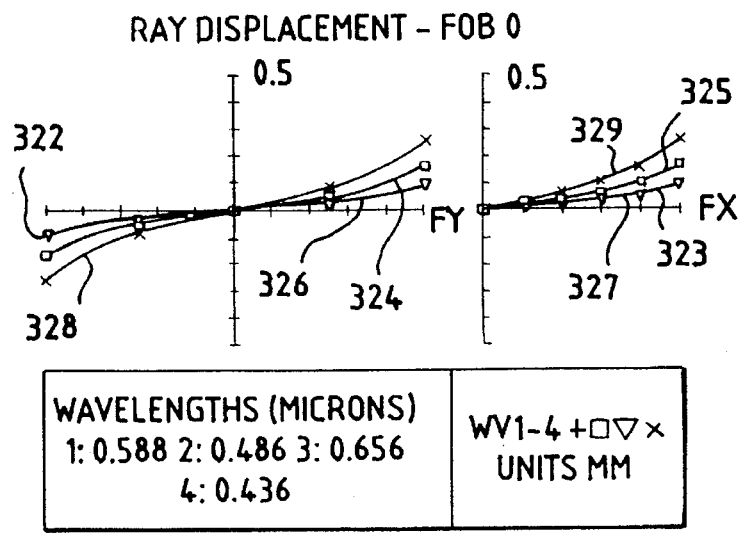
Figure 3A:
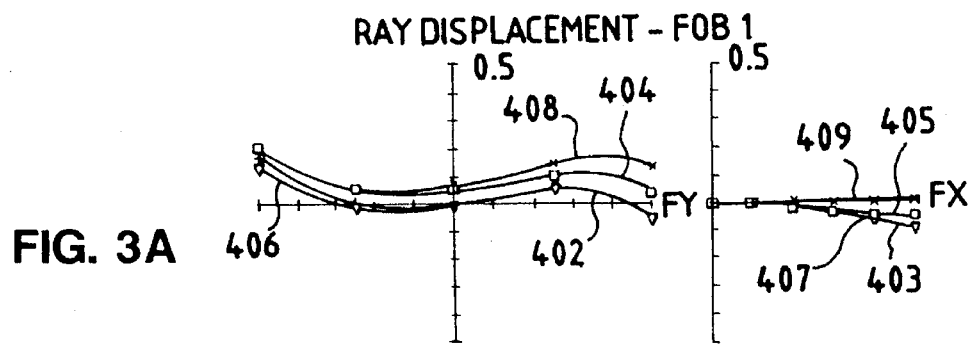
FIGS. 3A–3C is a graphical representation of ray deflection of the projection lens arrangement of FIG. 1 for various FOB lengths where the conjugate is 4.0 feet in length.
Figure 3B:
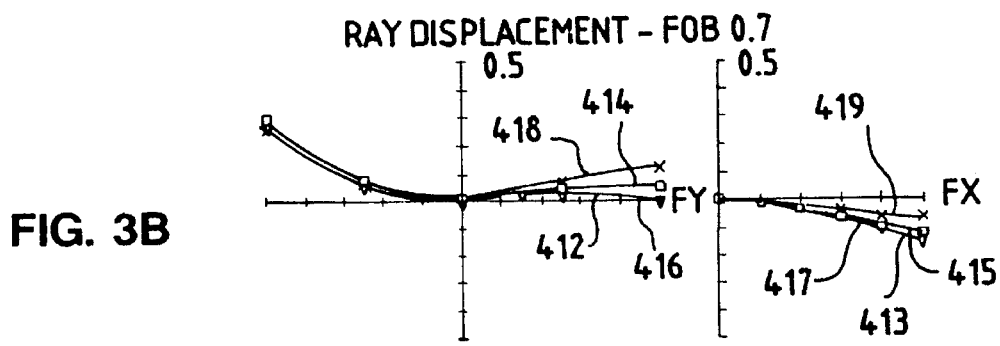
Figure 3C:
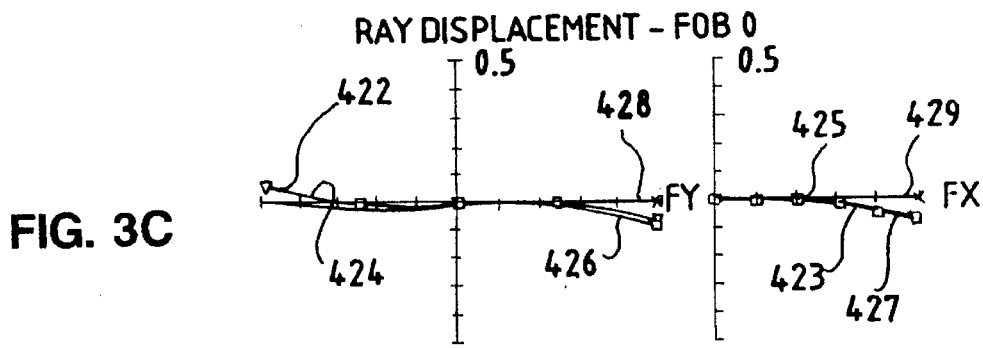
Figure 4A:
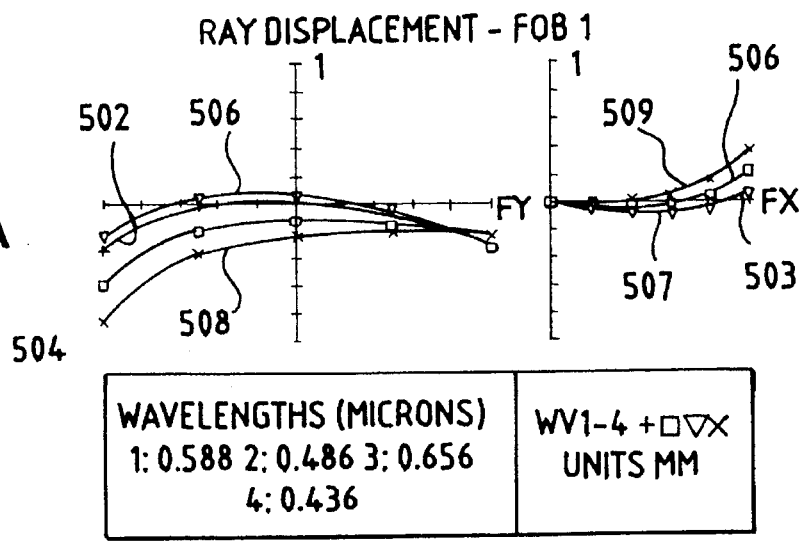
FIGS. 4A–4C is a graphical representation of ray deflection of the projection lens arrangement of FIG. 1 for various FOB lengths where the conjugate is 10.0 feet in length.
Figure 4B:
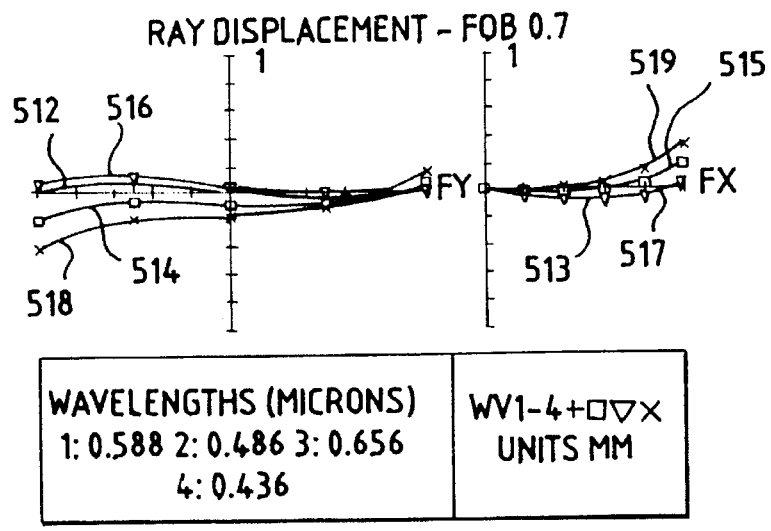
Figure 4C:
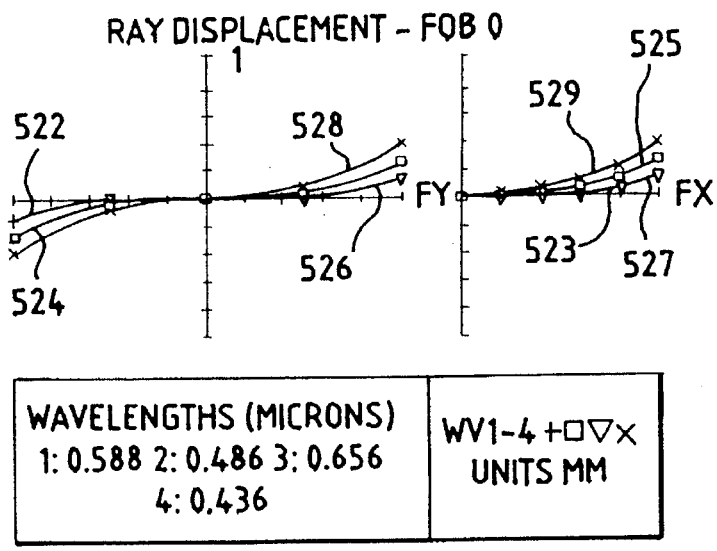

Referring now to FIGS. 2A–2C there is illustrated the ray displacement caused by the lens arrangement 20. FIG. 2A illustrates ray displacement where the FOB is about 1.0 and a 5.6 foot conjugate. In this regard, a pair of displacement curves 302 and 303 illustrates the ray displacement when the image wavelength is about 0.588 microns. Other pairs of ray displacement curves are illustrated for different image wavelengths such as a pair of displacement curves 304 and 305 illustrate the ray displacement when the image wavelength is about 0.486 microns; a pair of displacement curves 306 and 307 illustrate the ray displacement when the image wavelength is about 0.656 microns; and a pair of displacement curves 308 and 309 illustrate the ray displacement when the image wavelength is about 0.436 microns.

FIG. 2B is similar to FIG. 2A except the FOB is about 0.7. The pairs of ray displacement curves for wavelengths of 0.588; 0.486; 0.656; and 0.436 are 312,313; 314,315; 316, 317; and 318,319, respectively.

FIG. 2C is similar to FIGS. 2A and 2B except the FOB is about 0.0. The pairs of ray displacement curves for wavelengths of 0.588; 0.486; 09.656; and 0.436 are 322,323; 324,325; 326,327; and 328,329 respectively.

FIGS. 3A–3C and 4A–4C are similar to FIGS. 2A–2C and illustrate pairs of displacement curves for wavelengths of 0.588; 0.486; 0.656 and 0.436 relative to different FOB of 1.0, 0.7 and 0 respectively. In order to identify curve pairs in FIGS. 3A–3C and 4A–4C as described in FIGS. 2A–2C the first character reference number identifying the curves in FIGS. 3A-3C and 4A-4C have been sequentially increased. For example, a curve pair 402 and 403 correspond in description to the curve pair 302 and 303. Based on the foregoing, no further description will be provided for the 4.0 fast conjugate curves 402–409; 412–429; 422–429; and the 10.0 foot conjugate curves 502–509; 512–519; and 522–529.

Figure 5A:
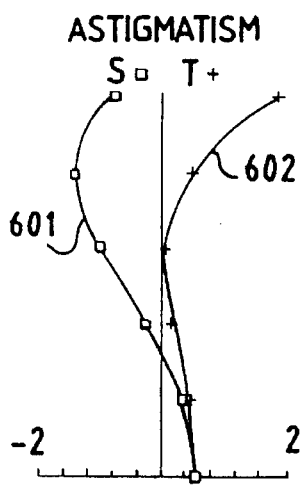
FIGS. 5A–5C are astigmatism, distortion, lateral color curves for the lens arrangement of FIG. 1 where the conjugate is 4.0 feet in length.
Figure 5B:
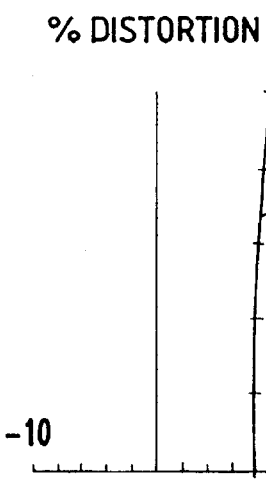
Figure 5C:
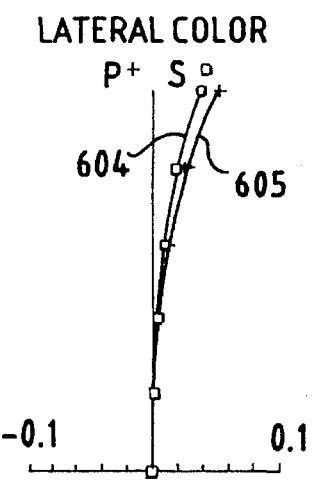
Figure 6A:
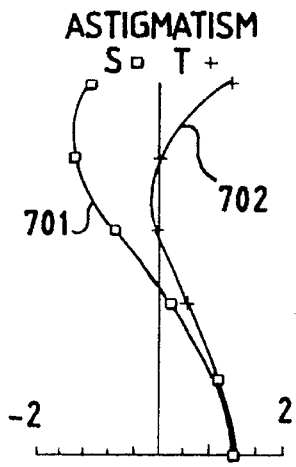
FIGS. 6A–6C are astigmatism, distortion, lateral color curves for the lens arrangement of FIG. 1 where the conjugate is 5.6 feet in length.
Figure 6B:
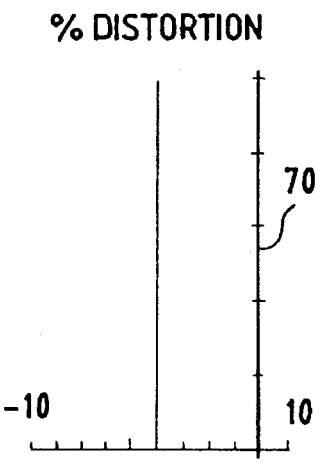
Figure 6C:
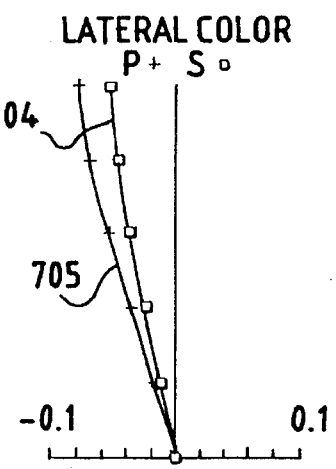
Figure 7A:
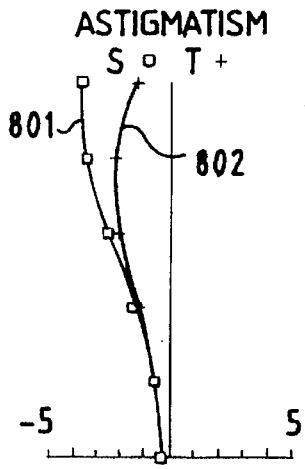
FIGS. 7A–7C are astigmatism, distortion, lateral color curves for the lens arrangement of FIG. 1 where the conjugate is 10.0 feet in length.
Figure 7B:
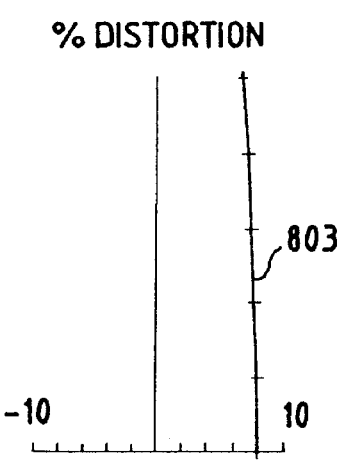
Figure 7C:
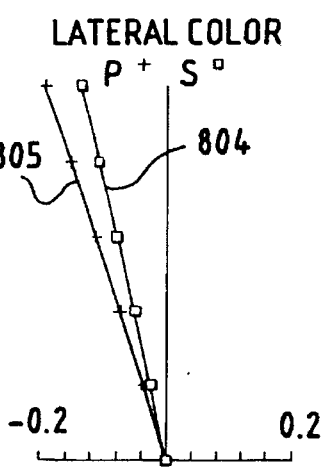

Referring now to FIGS. 5A–5C; FIGS. 6A–6C and FIG. 7A–7C there is illustrated astigmatism, distortion and lateral color curves for the lens arrangement examples having the 4.0 foot conjugate, 5.6 foot conjugate and 10 foot conjugate respectively. The respective astigmatism, distortion and lateral color curves are identified as 601; 602; 603; 604 and 605 for the 4.0 foot conjugate, 701; 702; 703; 704 and 705 for the 5.6 foot conjugate, and 801; 802; 803; 804 and 805 for the 10.0 foot conjugate.

Referring now to FIG. 8 there is illustrated a series of modulation transfer function curves 901–905 of the lens arrangement example having the 4.0 foot conjugate. Each curve depicted illustrates the modulation as a function of frequency (cycles per millimeter).

Figure 9:
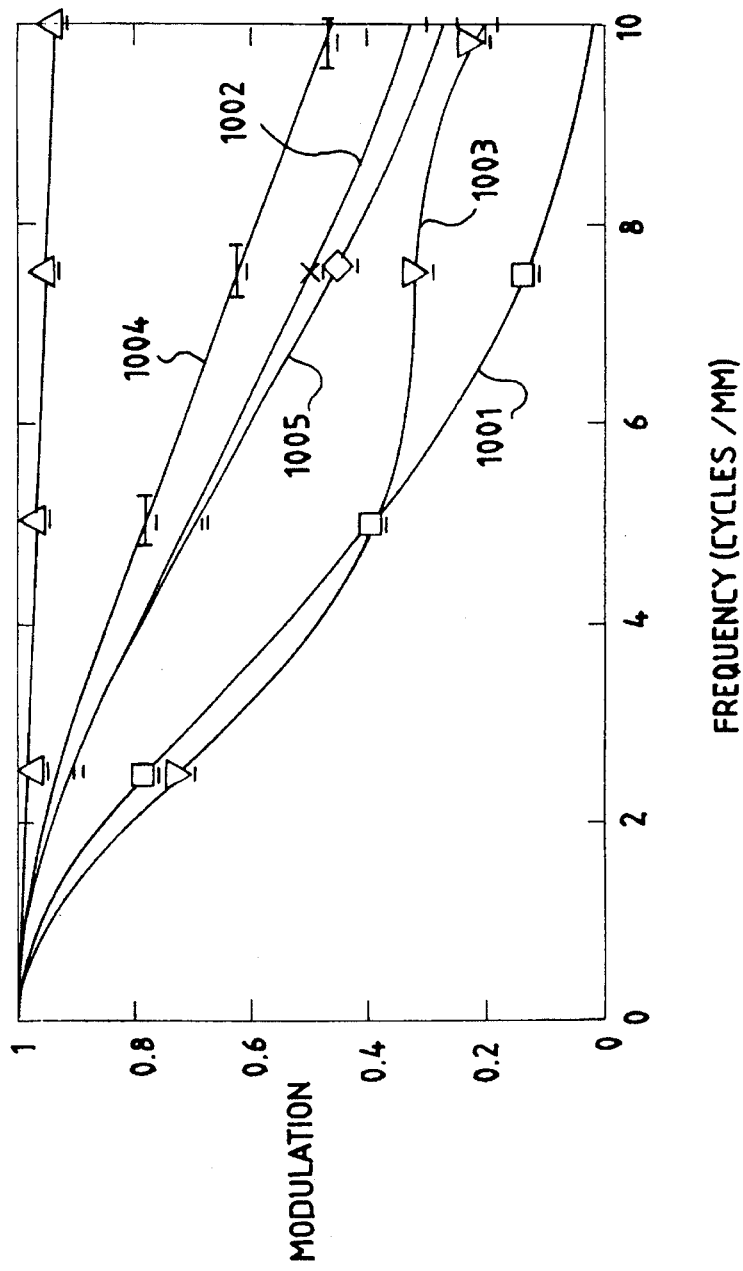
FIG. 9 is a modulation verus frequency representation of the modulation transfer functions of the lens arrangement of FIG. 1 where the conjugate is 5.6 feet in length.
Figure 10:
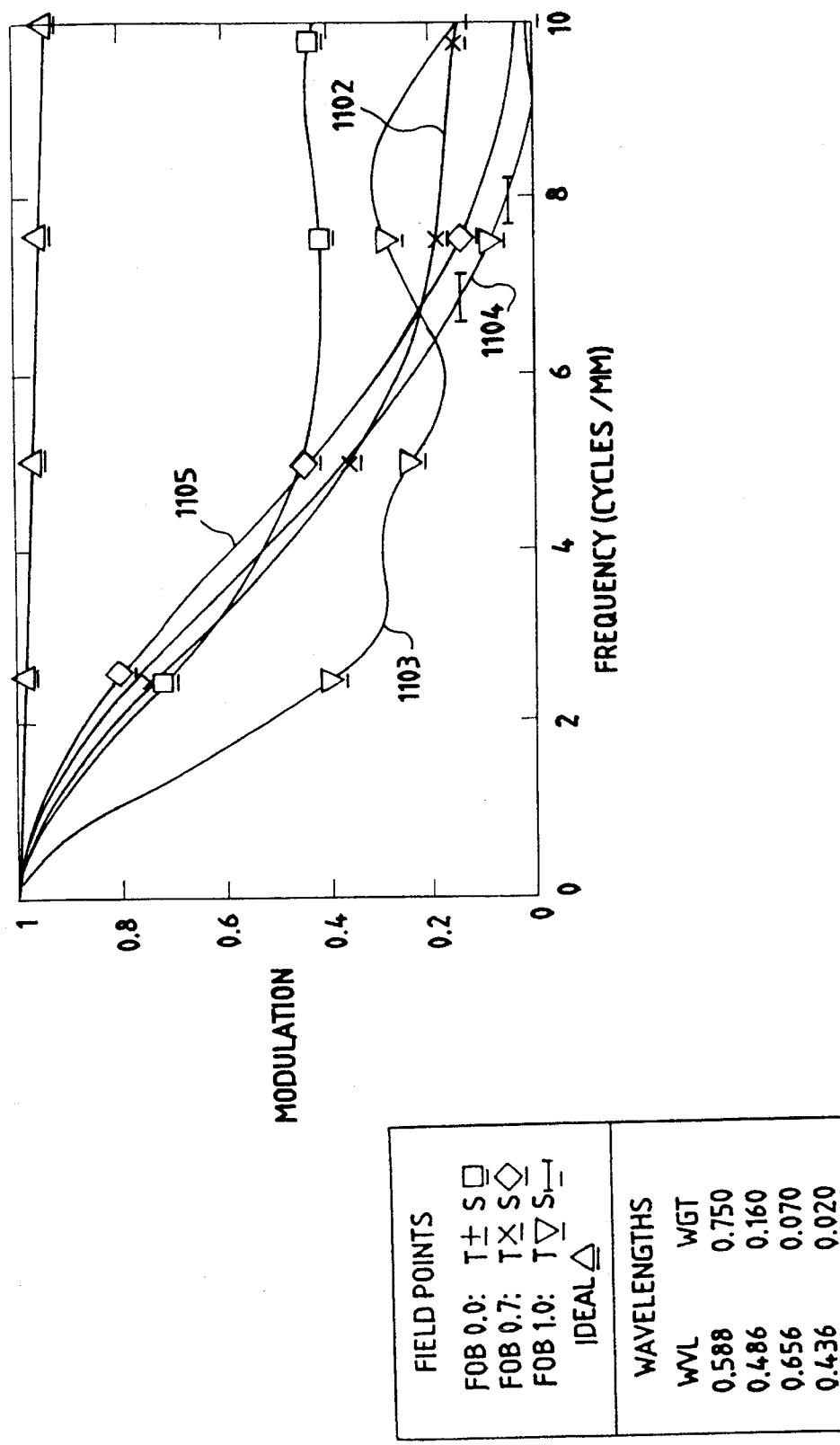
FIG. 10 is a modulation verus frequency representation of the modulation transfer functions of the lens arrangement of FIG. 1 where the conjugate is 10.0 feet in length.

FIGS. 9 and 10 are similar to FIG. 8 and illustrate a series of modulation transfer function curves 1001–1005 and 1100–1105 respective for the lens arrangement examples having 5.6 and 10.0 foot conjugates respectively.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A projection lens system for a liquid crystal display comprising a plurality of lens means groups arranged in a Tessar configuration having a vertex length D and a field angle coverage of up to about θ degrees;

said plurality of lens means groups including a first lens means group from the object end, said first lens means group including an optical doublet in the form of an optical element having a plano surface to the image end and a concave surface to the object end and an optical element having at least one aspheric surface complementary shaped to said concave surface, and a second lens means group comprising an optical bi-concave element.

2. A projection lens system, according to claim 1, further including a third lens means group comprising an optical element having substantially the same curvature as the first mentioned aspheric surface.

3. A projection lens system according to claim 1, wherein said plurality of lens means groups having a field angle coverage of up to about θ degrees where θ is up to about 22.1 degrees.

4. A projection lens system according to claim 3, wherein the vertex length D is about 46.22 millimeters.

5. A projection lens system according to claim 4, wherein the vertex length D is variable between about 38.02 millimeters and about 46.22 millimeters.

6. A projection lens system according to claim 5, wherein said first group, said second group and said third group having respective optical powers K1, K2 and K3, with an overall optical power of about 0.0037 inverse millimeter.

7. A projection lens according to claim 5, wherein K1 is about 0.00825 inverse millimeter.

8. A projection lens according to claim 5, wherein K2 is about −0.01365 inverse millimeter.

9. A projection lens according to claim 5, wherein K3 is about 0.00783 inverse millimeter.

10. A projection lens system according to claim 1, wherein the axial spacing between the surfaces of the first and second groups is adjustable between about 1.81 inches and about 1.497 inches.

11. A projection lens according to claim 1, wherein each lens surface is defined by the following relationship:

$$X = \left( \frac{Cy^2}{1 + \sqrt{1 - C^2(K+1)y^2}} \right) \quad (3)$$

and where X is a surface sag from the semi-aperture distance y from the axis or optical path P; where C is the curvature of a lens surface of the optical axis P equal to the reciprocal of the radius of the optical axis P; and where K is a conic constant (cc) or other surface of revolution.

12. A projection lens system according to claim 8, described substantially as follows:

A lens as shown in FIG. 1 scaled for a 5.6 foot conjugate; object distance of 1706.00000 mm; object height of -700.000000; and entrance pupil radius of 17.66231.

| Lens Ele. No. | Surf. Desig. | Radius (mm) | Axial Distance Between Surfaces (mm) | Aperture Radius (mm) | Element Comp. |
|---|---|---|---|---|---|
| | Entrance Pupil | | −17.09756 | 17.66231 K | AIR |
| L4 | S2 | 73.82133 | 7.50184 | 26.00000 K | BAK1 |
| | S3 | — 1112.99810 | 10.27072 V | 26.00000 K | AIR |
| L3 | S4 | −99.73322 | 2.69314 | 24.50000 A | LF5 |
| | S5 | 75.04693 | 8.70928 | 24.50000 | AIR |
| | S6 | −274.05990 | 2.81867 | 24.50000 K | KF6 |
| L2 | S7 | 62.88152 | 9.99902 | 24.50000 K | SK2 |
| 24 | S8 | −73.82133 | 289.33000 | 24.50000 K | AIR |
| | S9 | — | 3.98780 | 124.71569 S | ACRYLIC |
| | S10 | −46.72718 | 10.49020 | 132.00000 | AIR |

| Lens Element | Element Comp. | Refractive Indices (N_d) | | | |
|---|---|---|---|---|---|
| | | RN1/RN4 | RN2/RN5 | RN3/RN6 | VNBR |
| | AIR | — | — | — | — |
| L4 | BAK | 1.57250 | 1.57943 | 1.56949 | 57.54848 |
| | AIR | — | — | — | — |
| L3 | LF5 | 1.58144 1.59964 | 1.59146 — | 1.57723 — | 40.85149 — |
| | AIR | — | — | — | — |
| L2 | KF6 | 1.51742 1.52984 | 1.52434 — | 1.51443 — | 52.19566 — |
| 24 | SK2 | 1.60738 1.62073 | 1.61486 — | 1.60414 — | 56.65632 — |
| | AIR | — | — | — | — |
| | ACRYLIC | 1.49177 1.50377 | 1.49799 — | 1.48901 — | 56.01934 — |
| | AIR | — | — | — | — |

Aspheric parameters

| CC | −1.01435 |
|---|---|
| P1 | 0.00711 |
| P2 | $-2.6576 \times 10^{-8}$ |
| P3 | $4.1592 \times 10^{-14}$ |

-continued

| | |
|---|---|
| P4 | $1.5503 \times 10^{-17}$ | where L1–L4 are successive lens elements from the image end, S2–S9 are successive element surfaces where positive are surfaces convex to the image end and where negative are concave to the image end, Nd is the index of refraction of the lens elements and surface S10 is aspheric.

13. A projection lens system according to claim 1, wherein the first group includes a positive element having at least one surface near the object end and a nearly plano image side surface.

14. A projection lens system according to claim 1, wherein the second group consists of a negative bi-concave element.

15. A projection lens system according to claim 1, wherein the third group is a doublet having a positive bi-convex element and a negative element having one concave surface near the image end.

16. A projection lens system, comprising:
   a first optical element having an image end aspherical surface;
   a doublet optical element having an object end positive optical element and an image end negative optical element, said negative element having at least one concave surface, and said positive element being a bi-concave element having at least one object end surface and at least another image end surface complementary shaped to the concave surface of the negative optical element; and
   a second optical element disposed between said first optical element and said doublet optical element, said second optical element being a bi-concave element;
   said first, second and doublet optical elements being disposed rectilinearly on a common optical axis for defining a short optical path extending from the object and surface to the image end surface;
   said optical elements being arranged in a Tessar configuration having a field coverage angle of up to about 22.1 degrees and having a variable vertex length.

17. A projection lens system according to claim 12, wherein said short optical path is about 46.22 millimeters in length.

18. In a combination according to claim 17, wherein said plurality of lens means groups having a field angle coverage of up to about θ degrees and θ is up to about 22.1 degrees.

19. A projection lens system, comprising:
   a first optical element having an image end aspherical surface;
   a doublet optical element having an object end positive optical element and an image end negative optical element, said negative element having at least one concave surface, and said positive element being a bi-concave element having at least one object end aspherical surface and at least another image end aspherical surface complementary shaped to the concave surface of the negative optical element; and
   a second optical element disposed between said first optical element and said doublet optical element, said second optical element being a bi-concave element;
   said first, second and doublet optical elements being disposed rectilinearly on a common optical axis for defining a short optical path extending from the object end aspherical surface to the image end aspherical surface;
   said optical elements being arranged in a Tessar configuration having a field coverage angle of up to about 22.1 degrees and having a variable vertex length.

* * * * *

UNITED STATES PATENT AND TRADEMARK OFFICE
CERTIFICATE OF CORRECTION

PATENT NO. : 5,483,382

DATED : January 9, 1996

INVENTOR(S) : David Kappel

It is certified that error appears in the above-indentified patent and that said Letters Patent is hereby corrected as shown below:

In FIG. 1 of the drawings, directly above "FIG. 1", delete "S10" and the associated leader line.

In FIG. 1 of the drawings, at box 24, extend the leader line from S10 by 1/16" to enable it to contact the inner portion of the right most edge of box 24.

In the drawings, please substitute FIG. 1, attached, for FIG. 1 as it appears in the printed patent.

On the title page, item [63], delete "Mar. 11, 1993", and substitute therefor --May 11, 1993--.

Column 1, line 10, delete "Mar.", and substitute therefor --May--.

Column 4, line 64, delete "S5", and substitute therefor --S6--.

Column 4, line 65, delete "S4", and substitute therefor --S7--.

Column 4, line 66, delete "S4", and substitute therefor --S7--.

Column 4, line 67, delete "S3", and substitute therefor --S7A--.

Column 5, line 20, delete "S8 and S9", and substitute therefor --S3 and S2--.

Column 5, line 51, delete "object", and substitute therefor --image--.

Column 5, line 51, delete "at", and substitute therefor --of--.

UNITED STATES PATENT AND TRADEMARK OFFICE
CERTIFICATE OF CORRECTION

PATENT NO. : 5,483,382
DATED : January 9, 1996
INVENTOR(S) : David Kappel

It is certified that error appears in the above-indentified patent and that said Letters Patent is hereby corrected as shown below:

Column 5, line 51, delete "S1 of", and substitute therefor --S10 at--.

Column 6, line 4, delete "—", and substitute therefor -- -1112.9981 --.

Column 6, line 5, delete "1112.99810".

Column 7, line 39, delete "object", and substitute therefor --image--.

Column 7, line 41, delete "image", and substitute therefor --object--.

Column 7, line 42, delete "object", and substitute therefor --image--.

Column 7, line 43, delete "having at least one aspheric surface".

Column 7, line 46, after "element", delete ".", and substitute therefor --; and--.

Column 7, between lines 46 and 47, insert --aspheric surface means disposed in the same optic path as said groups--.

Column 8, line 35, delete "—", and substitute therefor -- -1112.9981 --.

Column 8, line 36, delete "1112.99810".

Column 9, line 8, delete "image", and substitute therefor --object--.

Column 9, line 12, delete "object", and substitute therefor --image--.

UNITED STATES PATENT AND TRADEMARK OFFICE
CERTIFICATE OF CORRECTION

PATENT NO. : 5,483,382

DATED : January 9, 1996

INVENTOR(S) : David Kappel

It is certified that error appears in the above-indentified patent and that said Letters Patent is hereby corrected as shown below:

Column 9, line 13, delete "image", and substitute therefor --object--.

Column 9, line 20, delete "image", and substitute therefor --object--.

Column 9, line 24, delete "object", and substitute therefor --image--.

Column 9, line 25, delete "image", and substitute therefor --object--.

Column 9, line 28, delete "object", and substitute therefor --image--.

Column 9, line 29, delete "image", and substitute therefor --object--.

Column 10, line 2, after "object", delete "and", and substitute therefor --end--.

Column 10, line 6, delete ".", and substitute therefor --; and aspheric surface means disposed in the same optical path as said elements.--.

Column 10, line 10, renumber claim 18 as claim 19.

Column 10, line 10, on newly renumbered claim 19, delete "claim 17", and substitute therefor --claim 18--.

Column 10, line 13, renumber claim 19 as claim 18.

UNITED STATES PATENT AND TRADEMARK OFFICE
CERTIFICATE OF CORRECTION

PATENT NO. : 5,483,382
DATED : January 9, 1996
INVENTOR(S) : David Kappel

It is certified that error appears in the above-indentified patent and that said Letters Patent is hereby corrected as shown below:

Column 10, line 13, delete entire text for newly renumbered claim 18

--A projection lens system according to claim 1, wherein the radius of curvature of the first group surface is substantially identical to the radius of curvature of the third group surface.--.

Signed and Sealed this

Tenth Day of September, 1996

Attest:

BRUCE LEHMAN

Attesting Officer

Commissioner of Patents and Trademarks